United States Patent [19]

Morigaki

[11] Patent Number: 4,795,891
[45] Date of Patent: Jan. 3, 1989

[54] CARD GUIDE DEVICE

[75] Inventor: Masamichi Morigaki, Kusatsu, Japan

[73] Assignee: Omron Tateisi Electronics Co., Kyoto, Japan

[21] Appl. No.: 24,970

[22] Filed: Mar. 12, 1987

[30] Foreign Application Priority Data

Mar. 14, 1986 [JP] Japan .............................. 61-38110[U]

[51] Int. Cl.⁴ .......................................... G06F 15/30
[52] U.S. Cl. .................................... 235/380; 235/483
[58] Field of Search .............. 235/380, 381, 384, 375, 235/483, 484, 379

[56] References Cited

U.S. PATENT DOCUMENTS 3,946,438 3/1976 Altmann et al. ................ 235/483 X Primary Examiner—Roy N. Envall, Jr.
Attorney, Agent, or Firm—Stevens, Davis, Miller & Mosher

[57] ABSTRACT

The card guide device is for supporting a card and includes a stationary guide and a movable guide for transport. The movable guide is movable toward and away from the stationary guide. A pair of card guide grooves are respectively formed on each of opposed surfaces of the stationary guide and the movable guide. Each groove has an inside dimension larger than the thickness of the card to be transported therethrough.

7 Claims, 2 Drawing Sheets

CARD GUIDE DEVICE

BACKGROUND OF THE INVENTION

1. Field of the Invention

The present device relates to a card guide device which may be used with an automatic transaction machine such as an automatic banking machine or cash machine installed for various transactions, which machine is actuated by a specified type of card, e.g., a magnetic card.

2. Discussion of the Prior Art

An automatic transaction machine, such as those mentioned above, is one which performs transactions with specified customers using specified cards, typically specified magnetic cards. As shown in FIG. 4, a magnetic card inserted into a conventional automatic transaction machine is gripped and transported by a stationary guide 1 and a movable guide 2 to a predetermined card processing section.

In the above arrangement, the movable guide 2 is displaced towards the stationary guide 1 as indicated by the chainline in association with the entry of the magnetic card A into the machine to perform breadth control of the card. If, however, the magnetic card A has been curled or otherwise deformed, the controlling position on the movable guide 2 (the position of abutment against the card) is shifted up or down according to the degree of deformation as shown by the broken line so that the force acting on the magnetic card A is weakened as the result of dispersion of stress a, b, thus detracting from the effectiveness of breadth control.

OBJECTS OF THE INVENTION

The present device has as its object to provide a card guide device in which the side edges of a card are fitted into card guide grooves formed on the stationary and movable guides so as to maintain a constant controlling position with respect to the card and avoid the dispersion of stress.

SUMMARY OF THE INVENTION

The present device is characterized in that it is a card guide device comprising a stationary guide and a movable guide which are provided with card guide grooves in juxtaposition, each of said card guide grooves being internally dimensioned larger than the thickness of the card.

In accordance with the present device, the right and left side edges of a card, e.g., a magnetic card, entered into the machine are fitted into the card guide grooves of the two guides and the curling and other deformations of the card are absorbed by the card guide grooves which are internally dimensioned larger than the thickness of the card so that the breadth controlling position on the movable guide for the card is kept constant and, hence, the effectiveness of breadth control is not sacrificed by the dispersion of stress, thus assuring an effective breadth control.

BRIEF DESCRIPTION OF THE DRAWINGS

The invention is described below in connection with the accompanying drawings which illustrate an embodiment of the present invention, wherein.

DETAILED DESCRIPTION OF THE INVENTION

An embodiment of the present device is described hereinafter with reference to FIGS. 1 through 3. In the foregoing discussion the card which is transported is described as a magnetic card for illustrative purposes only. It should be appreciated that any type of card may be used with the invention.

Figure 1:
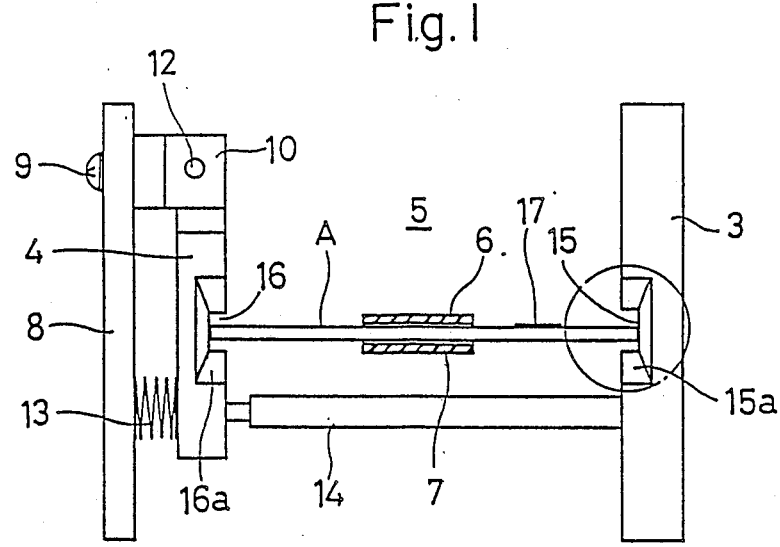
FIG. 1 is a front view of the card guide device.

In the several views of the drawings which show a magnetic card guide device and particularly referring to FIG. 1, a stationary guide 3 and a movable guide 4 are disposed in juxtaposition at a predetermined interval to define a card transport path 5 between the guides 3 and 4 and an upper and a lower transport belt 6, 7 adapted to support therebetween and transport a magnetic card A taken into said card transport path 5. A roller means may be employed in lieu of the transport belts 6, 7.

The movable guide 4 is suspended from a stationary frame 8 erected externally thereof, and brackets 10, 10 are secured to top ends of stationary frame 8 by screws 9 along the card transport direction. As shown in FIG. 2, top shoulder parts of the movable guide 4 are cut out in correspondence with brackets 10, 10 and as the bracket 10 is fitted in the shoulder cutout 11, a pin 12 of the movable guide 4 extends into the bracket 10. Therefore, the movable guide 4 is freely rotatable about the pin 12 to move toward or away from the stationary guide 3.

A spring member 13 is interposed between the rear face of the lower end of said movable guide 4 and the stationary frame 8, and a space limiting member 14 projects from the stationary guide 3 towards the movable guide 4. The spring member 13 biases the movable guide 4 against the tip of the space limiting member 14 to control the width of the card transport path between the two guides 3, 4. In the drawing, the spring member 13 is interposed at either end of the movable guide 4.

Above the spring member 13 and space limiting member 14, the stationary guide 3 and movable guide 4 are provided with card guide grooves 15 and 16, respectively, over the entire length of the card transport path in correspondence with the magnetic card A to be transported by transport belts 6, 7. Each of these card guide grooves 15, 16 is formed with a vertical dimension larger than the thickness of the magnetic card A. This construction takes care of curling and other deformations of the magnetic card A and positions the side edges of the card snugly in the grooves.

Figure 2:
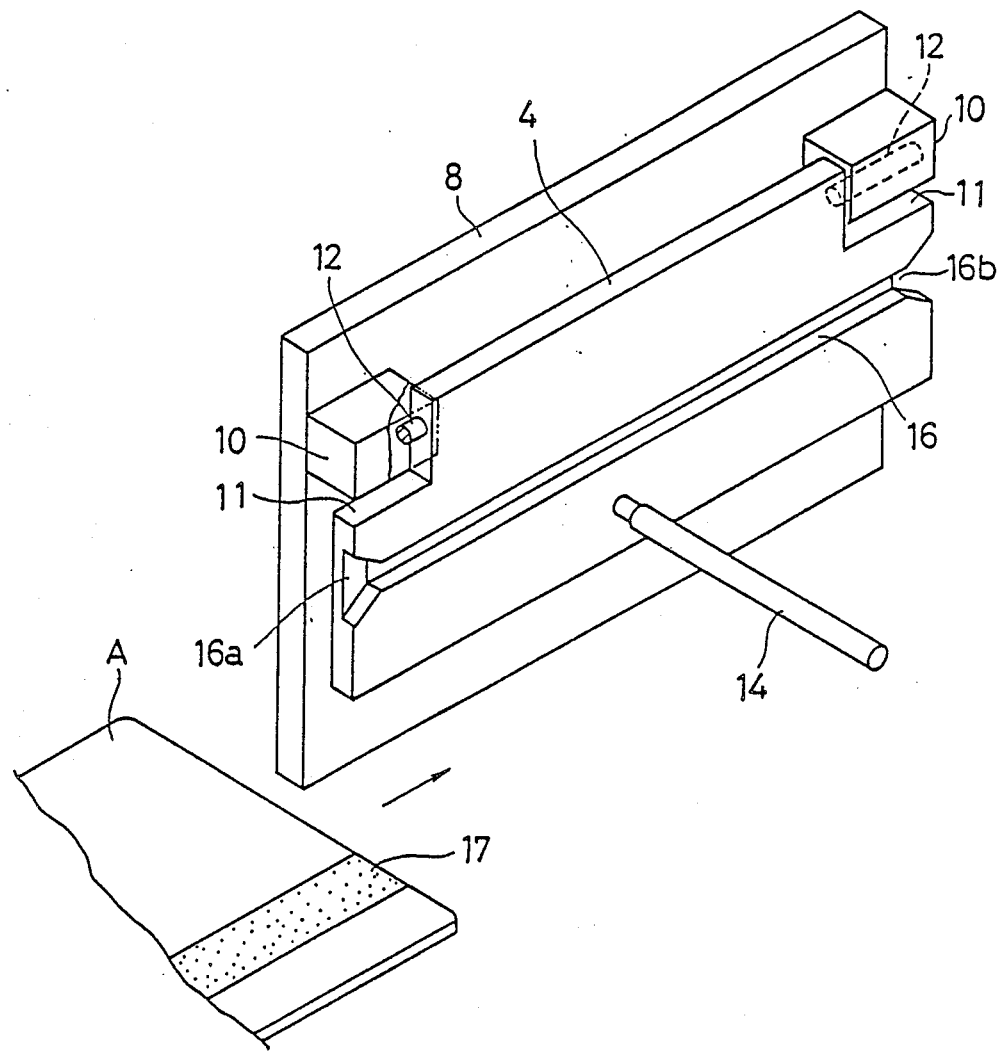
FIG. 2 is a perspective view showing the card guide device.

The card guide grooves 15, 16 are vertically flared at their inlet portions 15a, 16b, respectively, as shown clearly in FIG. 2 so that the side edges of the magnetic card A may be smoothly introduced into the card guide grooves 15, 16. This construction is also useful in tucking in a deformed magnetic card referred to above into the card guide grooves 15, 16.

The exit portions 16b of the card guide grooves 15, 16 are also flared just as are the inlet portions 15a, 16b. This construction is predicated on the assumption of a forward motion discharge of the card. Thus, after the magnetic card A is tucked in and transported and the magnetic stripes 17 on the magnetic card A are read by a card differentiation section (not shown), the card is then forwardly discharged. However, there are also cases in which the magnetic card A is transported in a reverse direction for discharge. If this is the case, the flaring of the exit portion 16b is not required.

Figure 3:
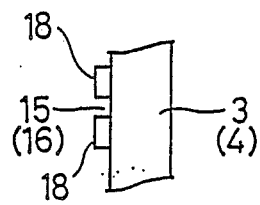
FIG. 3 is a view showing a modified card guide groove.
Figure 4:
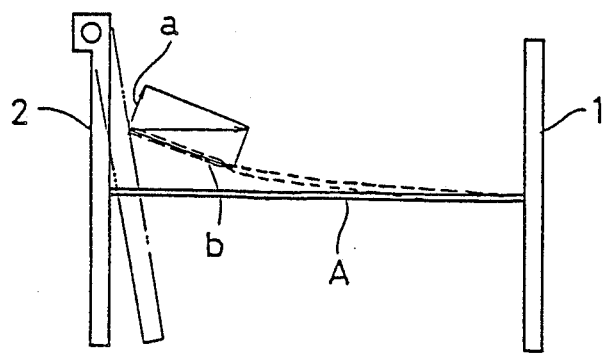
FIG. 4 is a schematic view for explaining the problems of the conventional card guide device.

While, in FIGS. 1 and 2, the card guide grooves 15, 16 are provided by cutting out the stationary guide 3 and movable guide 4, respectively, it is possible to form, as illustrated in FIG. 3, card guide grooves 15, 16 by and between a pair of upper and lower strip members 18, 18 bonded to the guides 3, 4.

The magnetic card A inserted by a customer into an automatic transaction machine is tucked into the card transport path 5 between the stationary guide 3 and movable guide 4, whereupon the right and left side edges of the magnetic card A are guided into the card guide grooves 15, 16 via the flared inlet portions 15a, 16a.

Since the movable guide 4 is biased against the stationary guide 3 by spring member 13, the same biasing force causes the magnetic card A, too, to be biased towards the stationary guide 3. When the lateral width of the magnetic card A is large, the movable guide 4 is driven back towards the stationary frame 8 about the pin 12 against the spring 13 to take care of the lateral width. However, since the magnetic card A is subject to the pressing force of the spring member 13 through the movable guide 4, the magnetic card A is always positioned with the side adjoining to the stationary guide 3 as the reference.

Since both side edges of the magnetic card A are situated in the card guide grooves 15, 16, the card is not vertically deflected due to its deformation and the position of the card as limited by the movable guide 4 is kept constant so that the magnetic card A occupies a proper predetermined position in the card transport path 5 and is transported by and between transport belts 6, 7.

Moreover, as the card guide grooves 15, 16 are provided over the whole length of the stationary and movable guides 3, 4, i.e., throughout the whole length of the card transport path 5, the attitude of the magnetic card A is controlled by the card guide grooves throughout the whole transport process so that the transport of the card is facilitated.

Thus, since in the above embodiment, the attitude or orientation of the magnetic card A in the card transport path is controlled with its edges fitted in the card guide grooves 15 and 16, the controlling position of the movable guide with respect to the magnetic card is constant, irrespective of whether the card has been deformed or not, without a dispersion of controlling stress, thus assuring a positive breadth control.

Although preferred embodiments of the invention have been shown and described, it should be appreciated that various modifications can be made without departing from the sprit and scope of the invention. Accordingly, the invention is not limited by the foregoing description, but is only limited by the scope of the claims appended hereto.

I claim:

1. A card guide device comprising a stationary guide and a movable guide for transport, said movable guide being movable toward and away from said stationary guide, a pair of card guide grooves respectively formed on each of opposed surfaces of said stationary guide and said movable guide, each groove having an inside dimension larger than the thickness of the card to be transported therethrough, means for pivotably supporting said movable guide and means for biasing said movable guide so that it pivots toward said stationary guide.

2. A card guide device as in claim 1, further comprising means for limiting the extent of movement of said movable guide toward said stationary guide.

3. A card guide device as in claim 2, wherein said limiting means is a member extending between said stationary guide and said movable guide.

4. A card guide device as in claim 1, wherein said guide grooves are flared at an inlet side of said card guide device.

5. A card guide device as in claim 4, wherein said guide grooves are flared at an outlet side of said card guide device.

6. A card guide device as in claim 1, wherein said grooves are formed as cutouts in plate-like members forming said stationary guide and said movable guide.

7. A card guide device as in claim 1, wherein said grooves are formed by opposing strip members affixed to plate-like members forming said stationary guide and said movable guide.

* * * * *